United States Patent [19]
Moneymaker et al.

[11] 3,875,315
[45] Apr. 1, 1975

[54] TREATMENT OF WHEY WITH SURFACTANTS

[75] Inventors: John R. Moneymaker; Bert W. Landfried, both of Overland Park, Kans.

[73] Assignee: Top-Scor Products, Inc., Kansas City, Kans.

[22] Filed: May 7, 1973

[21] Appl. No.: 358,086

[52] U.S. Cl.................. 426/343, 426/18, 426/152, 426/185, 426/187, 426/345, 426/356, 426/358
[51] Int. Cl. ..................... A21d 13/00, A23c 21/00
[58] Field of Search ........... 426/185, 187, 345, 358, 426/471, 343, 18, 19, 24, 364, 356

[56] References Cited
UNITED STATES PATENTS

| | | | |
|---|---|---|---|
| 2,509,927 | 5/1950 | Johnston | 426/24 |
| 3,615,663 | 10/1971 | Becker | 426/471 |

OTHER PUBLICATIONS

Hibbs et al., The Solubility of Whole Milk Powder as Affected by Protein Stabilizers and by Emulsifiers, J. Dairy Science, Vol. 34, 1951, (pp. 1084–1091) SF221J8.

Webb et al., By Products from Milk, The Air Publishing Co., Inc., Westport, Conn., 1970, (pp. 213-215) SF239W58.

*Primary Examiner*—David M. Nafe
*Attorney, Agent, or Firm*—Fishburn, Gold and Litman

[57] ABSTRACT

Edible, non-ionic, water dispersible surfactants such as polyoxyethylene (20) mono-diglyceride and polyoxyethylene (20) sorbitan monostearate are combined with whey in a water based concentrate and the resultant composition is dried. The treated whey solids, when introduced into doughs for yeast-raised products, imparts increased water holding capacity and improved physical quality over products containing untreated whey.

6 Claims, No Drawings

TREATMENT OF WHEY WITH SURFACTANTS

This invention relates to yeast-raised bakery products containing whey and more particularly to a treatment of whey and the resultant whey product which, when utilized in yeast-raised doughs, provides significant advantages over the similar use of untreated whey.

Whey is derived from milk as a by product of cheese making operations, consisting of the remaining material after removal of the majority of casein protein and fat. Whey is relatively rich in lactose sugar, lactalbumin protein and mineral matter, including calcium, sodium, phosphate and potassium ions. The composition of whey varies, primarily depending upon the type of cheese, the particular cheese producing process, and the source of milk, most dry whey containing about one-third of the protein found in dry skim milk.

Proper use of milk solids in baked products is known to provide certain advantages, including the retention of greater moisture in the dough and, in some applications, a beneficial buffering action. Especially non-fat dry milk solids (NFDMS), obtained from high heat treated milk, was previously used in large quantities for many years in yeast-raised doughs to improve among other items, the nutritional value of bread and impart a pleasing flavor, aroma and better crust color. However, the development and wide acceptance of the so-called continuous bread processes and prevalent economic considerations have more recently sharply reduced usage of NFDMS in the United States. It is presently the common practice to use very low levels of one or two percent of NFDMS or proprietary substitutes therefor which contain only minor amounts of milk products. These low levels or substitutes do not provide the advantages of full use of milk solids.

In theory, whey solids may be added at twice the level of NFDMS to provide, among other advantages, acceptable replacement of the nutritional value produced by NFDMS supplied lysine fortification, the shortage of which tends to limit protein utilization of wheat. However, attempts to substitute the more available dry or condensed whey obtained from cheese manufacture have been relatively unsuccessful. As with NFDMS, whey solids do improve crumb flavor and aroma and provide desirable crust color modification, however, these advantages are largely offset in practical utilization by certain serious physical objections. Doughs containing significant levels of ordinary whey tend to be slack and slow to develop properly. Also, it is necessary to reduce moisture incorporation over that permissible when utilizing NFDMS and whey enriched doughs characteristically exhibit poor handleability in the mechanical equipment associated with high speed continuous process bakeries. A product of overall poor physical quality generally results with notable loss of moisture retention, grain, texture and loaf specific volume.

Many attempts have been made to modify, fortify or enrich whey so that it may be better usable as a substitute for NFDMS and some processing methods have come into general use for this purpose. For example, proper heat treatment and pH control prior to drying improve the baking properties of whey solids to some extent. However, for the most part, expensive blends of whey containing caseinates or with relatively low whey content must be resorted to for alleviation of the undesirable effects.

The principal objects of this invention are: to provide a treatment for whey and resultant improved whey product which may be introduced into yeast-raised doughs at levels sufficient to provide the nutritional and product quality advantages of NFDMS without the disadvantages associated with untreated whey; to provide an improved whey product which is less expensive and more effective than whey products heretofore available, and to provide an improved substitute for NFDMS which yields baked products having the desired close interior grain, soft crumb texture and high loaf volume necessary for wide popular acceptance.

In accordance with this invention, edible non-ionic surfactants, which may be considered derivatives of the polyethylene glycols, have been found to act on whey proteins to increase water holding capacity and otherwise improve the baking properties of dry whey solids. The preferred surfactants are partial fatty acid esters of polyhydroxy compounds which have been reacted with oxyethylene. More specifically, materials suitable for the practice of this invention include polyoxyethylene (20) monodiglyceride and polyoxyethylene (20) sorbitan monostearate. Both of these agents are known dough improvers, however, the improvements obtained in the practice of this invention far exceeds that obtained by the addition of the agents into the dough alone or with untreated whey. Thus, the simple dry blending of the agent with dry whey solids or separate addition to a dough system does not produce the same technical improvements observed with proper pretreatment of the whey with the surfactant.

The preferred surfactants are water dispersible and, for treating the whey, may be introduced easily into warm whey, or whey concentrate, preferably at about 120° F. Only mild agitation of the whey or whey concentrate is required to achieve adequate dispersion and the composition is then dried to complete the treatment. If desired, whey solids may be moistened with a dispersion of the particular surfactants and the mix redried to achieve the desired modifying effect. Optimum results are achieved by adjusting pH using, preferably, calcium oxide or calcium hydroxide, to a value of 5.6 – 6.4. Whey products containing not more than about 2.5% acidity, as lactic, on a dry basis are preferred even though higher acid content materials are satisfactory. It has been found that a level as low as 0.5% surfactant based upon finished whey product dry weight has a detectible effect while levels in excess of 5.0% produce no additional change in whey solids function. A treatment level of close to 2.5% agent based upon dry solids is generally preferred, providing the protein modification desired without undue whey dilution.

EXAMPLE I

By way of example in the practice of this invention, a normal high crystalline cheddar cheese whey concentrate, which was treated with calcium oxide to a pH of 6.2, was warmed to 130° F. following initial production thereof, just prior to drying. In the constant feed to the dryer a positive pressure metering pump was connected and EMG-20 [Breddo Food Products Corporation brand of polyoxyethylene (20) mono-diglyceride], previously warmed to 125° F., was introduced on a continuous basis at a level resulting in a final content in the dried product of from 2.47% to 2.66%. Spray drying was carried out in the normal manner with no changes in temperature or procedure required. The final product was normal in appearance and assay with the single exception of increased lipid content, due to EMG-20, as detailed above.

A Brabender Instruments, Inc. farinograph torque measuring recording dough mixer was used to demonstrate the alteration in the whey product produced by this treatment. The farinograph measures the plasticity and mobility of a dough subjected to a prolonged, relatively gentle, mixing action at a constant temperature. The resistance the dough offers to the mixing blades during mixing is transmitted to a dynamometer which is connected to a lever and scale system and to a pen which traces a curve on a Kymograph chart scaled from 0 to 1,000 Brabender units. In essence, the instrument is a recording viscometer.

It is known that viscosity at constant moisture content is an important factor in baking performance changes attributable to milk or milk substitutes since it relates to the amount of water closely held by the product in a dough mix. Higher viscosities are associated with improved performance.

The above treated product was compared at constant moisture content with untreated cheddar cheese whey and a homogeneous physical mixture containing a like amount of EMG-20 mixed on a dry basis. Results are recorded in Table I.

TABLE I

|  | Viscosity (Bu) 5 Min. Mix | 10 Min. Mix | 15 Min. Mix |
|---|---|---|---|
| Untreated Whey Solids | 145 | 135 | 130 |
| Physical Mixture (Control) | 130 | 120 | 110 |
| EMG-20 Treated Whey Solids | 330 | 310 | 300 |

The results indicated that dry physical mixing of the same level of EMG-20 with whey did not provide the beneficial change in character produced with the treatment described.

EXAMPLE II

Comparative baking evaluations were carried out using a conventional sponge-dough preparation method with 65 percent of the formula flour in the sponge. Three percent, based on flour, of dry whey products of Example I were respectively introduced with the dough ingredients. The physical condition of the dough following mixing and mechanical rounding was carefully examined and judged by a trained observer. The bread formula follows:

|  | Parts by Weight |
|---|---|
| Patent Flour (14% moisture basis) | 700 |
| Bakers Compressed Yeast | 17.5 |
| Sucrose | 28.0 |
| Cerelose | 28.0 |
| Whey Solids | 21.0 |
| Lard | 17.5 |
| Salt | 14.0 |
| Arkady Yeast Food | 3.5 |
| Water | 472.5 |

Each test was performed in duplicate. Following baking in 1-pound units, the loaves were allowed to cool under controlled conditions and stored in polyethylene bags for 18 hours. Load volume was then measured by rape seed displacement and the test bread was cut and scored subjectively using a system which separately takes into account the major internal and external characteristics of the loaves. These characteristics include loaf volume, crust color, crust character, break and shred, grain, texture, crumb color, aroma, taste and easting quality. In this scoring system each factor is considered separately and penalized according to the degree of deviation from a hypothetical perfect loaf which would score 100. An acceptable commercial loaf will receive a score of 90 or higher, with a score of 94 or higher considered excellent. This system is based essentially on that promulgated by the American Institute of Baking and is comparable to the various methods in use throughout the baking and milling industries.

Considered significant are variations in quality scores within a single test series of one point or greater, variation in average loaf volume of 100 cc per pound and time greater than 1.5 minutes required to proof loaves to height. Results follow in Table II.

TABLE II

|  | Average Loaf Proof Time Min. | Average 1-lb. Loaf Vol. cc | Average Total Quality Score |
|---|---|---|---|
| Untreated Whey Solids | 56 | 2732 | 92.5 |
| Physical Mixture (Control) | 55 | 2767 | 93 |
| EMG-20 Treated Whey Solids | 52 | 2875 | 94 |

The treated product was found to be superior in every respect to both ordinary whey solids and a simple homogeneous mixture of the surfactant with whey solids.

EXAMPLE III

Using a different source of cheese whey, Tween 60 [Atlas Chemical Co. brand of polyoxyethylene (20) sorbitan monostearate] was introduced, at a level of 5.0 percent based on the final dried product, to reconstituted, 50 percent solids whey concentrate, pH adjusted to 6.0. The blend was brought to 140° F., then freeze dried and ground to pass a U. S. 40 mesh screen.

Baking comparison with the same lot of whey which was not treated was carried out, using the method described above, and a summary of the results follow in Table III.

TABLE III

|  | Average Loaf Proof Time Min. | Average 1-lb. Loaf Vol. cc | Average Total Quality Score |
|---|---|---|---|
| Untreated Whey Solids (Control) | 56 | 2675 | 90 |
| Tween 60 Treated Whey Solids | 53 | 2800 | 94 |

The treated product was found to be superior to the untreated control in all respects.

It is to be understood, that while certain practices of this invention have been illustrated and described, it is not to be limited thereto except insofar as such limitations are included in the following claims.

What is claimed and desired to secure by Letters Patent is:

1. A method of producing bakery products comprising the steps of:
    a. introducing an edible, non-ionic, water dispersible surfactant taken from the group consisting of polyoxyethylene (20) mono-diglyceride and polyoxyethylene (20) sorbitan monostearate into an aqueous whey solution to form an aqueous mixture in an amount equal to approximately 0.5% to 5.0% based upon the dry weight of the mixture,
    b. agitating the aqueous mixture to achieve dispersion,
    c. drying the mixture, and
    d. incorporating the dried mixture in a substantial amount in a flour-containing mixture to form a dough, and baking the dough.

2. The method of claim 1 wherein said mix is a yeast dough.

3. The method of claim 1 wherein said surfactant is present in said mixture in an amount equal to approximately 2.5% based upon mixture dried weight.

4. The method of claim 1 wherein said surfactant is present in said mixture in an amount equal to approximately 5% based upon mixture dried weight.

5. The method of claim 1 wherein said whey aqueous solution is about 50% solids whey concentrate.

6. The method of claim 1 wherein said dried mixture is incorporated in the mix in an amount equal to approximately 3% by weight based upon flour in the mix.

* * * * *